(12) United States Patent
Shiraki

(10) Patent No.: US 7,995,579 B2
(45) Date of Patent: Aug. 9, 2011

(54) PACKET TRANSFER CONTROLLING APPARATUS AND PACKET TRANSFER CONTROLLING METHOD

(75) Inventor: Osamu Shiraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/330,108

(22) Filed: Dec. 8, 2008

(65) Prior Publication Data

US 2009/0262734 A1   Oct. 22, 2009

(30) Foreign Application Priority Data

Apr. 21, 2008 (JP) ................................ 2008-110208

(51) Int. Cl.
*H04L 12/28* (2006.01)
(52) U.S. Cl. ..................................... 370/392; 370/395.3
(58) Field of Classification Search .................. 370/392, 370/393, 394, 396, 397, 398, 399, 400, 389, 370/395.32
See application file for complete search history.

(56) References Cited

U.S. PATENT DOCUMENTS

| | | | | |
|---|---|---|---|---|
| 6,377,577 | B1 * | 4/2002 | Bechtolsheim et al. | 370/392 |
| 6,778,984 | B1 * | 8/2004 | Lu et al. | 1/1 |
| 2002/0067726 | A1 * | 6/2002 | Ganesh et al. | 370/392 |
| 2002/0176417 | A1 * | 11/2002 | Wu et al. | 370/389 |
| 2003/0053460 | A1 * | 3/2003 | Suda et al. | 370/392 |
| 2003/0126272 | A1 * | 7/2003 | Corl et al. | 709/230 |
| 2004/0205292 | A1 * | 10/2004 | Lu | 711/108 |
| 2004/0258043 | A1 * | 12/2004 | Engbersen et al. | 370/351 |
| 2006/0041725 | A1 * | 2/2006 | Lakshmanamurthy et al. | 711/154 |
| 2007/0070900 | A1 * | 3/2007 | Heink et al. | 370/230 |
| 2007/0171911 | A1 * | 7/2007 | Ku | 370/392 |
| 2007/0255679 | A1 * | 11/2007 | Hosoi et al. | 707/1 |
| 2008/0205405 | A1 * | 8/2008 | Corl et al. | 370/392 |

FOREIGN PATENT DOCUMENTS

JP   11-088436   3/1999

OTHER PUBLICATIONS

European Search Report dated Sep. 4, 2009, from the corresponding European Application.

* cited by examiner

*Primary Examiner* — Kwang B Yao
*Assistant Examiner* — Juvena Loo
(74) *Attorney, Agent, or Firm* — Fujitsu Patent Center

(57) ABSTRACT

A packet transfer controlling apparatus stores, for each of a plurality of comparators, a plurality of associations of a code and a classification to be compared by the comparator when specification of the code is accepted. Also, each selector sets information that belongs to a classification stored in association with the accepted code as information to be selected from the packet. Then, each selector selects the set information when an input of a packet is accepted. Then, each comparator outputs a comparison result indicating whether the information selected by the selector and a comparison value match each other. Next, when the comparison result is output from every comparator, a rule searching unit conducts a search to see which rule the packet is relevant to among a plurality of rules, and then outputs a rule number.

2 Claims, 14 Drawing Sheets

FIG.3

| CODE | COMPA-RATOR 1 | COMPA-RATOR 2 | COMPA-RATOR 3 | COMPA-RATOR 4 | COMPA-RATOR 5 | COMPARATOR 6 | COMPA-RATOR 7 | COMPA-RATOR 8 |
|---|---|---|---|---|---|---|---|---|
| 1 | DA [15:0] | DA [31:16] | SA [15:0] | SA [31:16] | DA [47:32] | SA [47:32] | VID [11:0] | Ether Type |
| 2 | DIP [15:0] | DIP [31:16] | SIP [15:0] | SIP [31:16] | DIP MASK SIP MASK | PROTOCOL (H [15:8]/ L [7:0]) | DP [15:0] | SP [15:0] |
| 3 | DIPv6 [15:0] | DIPv6 [31:16] | DIPv6 [47:32] | DIPv6 [63:48] | DIPv6 Mask | (RESERVED) | DP_L | DP_H |
| 4 | SIPv6 [15:0] | SIPv6 [31:16] | SIPv6 [47:32] | SIPv6 [63:48] | SIPv6 Mask | (RESERVED) | SP_L | SP_H |
| 5 | DSCP / Mask | (RESERVED) | ICMP Type / Mask | ICMP Code / Mask | DIP [15:0] | DIP [31:16] | VLAN Pri. / Mask | VID [11:0] |
| 6 | SA [15:0] | SA [31:16] | DA [15:0] | DA [31:16] | SA [47:32] | DA [47:32] | SIP [15:0] | SIP [31:16] |

PACKET TRANSFER CONTROLLING APPARATUS AND PACKET TRANSFER CONTROLLING METHOD

CROSS-REFERENCE TO RELATED APPLICATIONS

This application is based upon and claims the benefit of priority of the prior Japanese Patent Application No. 2008-110208, filed on Apr. 21, 2008, the entire contents of which are incorporated herein by reference.

BACKGROUND

1. Field

The present invention relates to a packet transfer controlling apparatus and packet transfer controlling method.

2. Description of the Related Art

Apparatuses such as network devices and computers connected to a network generally set an Access Control List (ACL) for the purpose of, for example, preventing unauthorized access via the network (for example, refer to Japanese Patent Application Laid-open No. H11-88436). Also, such apparatuses as network devices and computers set the access control list for the purpose of, for example, changing a destination of packet transfer according to communication.

For example, as depicted in FIG. 14, a switch, which is a network device, sets an access control list on a receiving port side connecting to a Local Area Network (LAN). At this time, the switch sets the access control list with a rule described according to a pattern. Here, the pattern means, for example, a selection of pieces of information included in the packet to be compared for matching, and a way of combination of the selected pieces of information to be compared for matching. The switch then compares the information included in the packet input to the switch with the rule, thereby preventing unauthorized access or changing a server of a transfer destination. FIG. 14 is a drawing for explaining an access control list.

Techniques for implementing an access control list into an apparatus include a technique of implementing by software and a technique of implementing by hardware, the latter being suitable for high-speed processing. Also, the technique of implementing by hardware is classified as a Content Addressable Memory (CAM) type and a Flip-Flop (FF) circuit type as depicted in FIGS. 15A and 15B. FIGS. 15A (CAM type) and 15B (FF type) are drawings for explaining conventional technologies.

Meanwhile, the conventional technologies explained above have a problem such that a reduction in circuitry size and an access control with various and complex patterns cannot both be achieved. That is, the apparatus set with an access control list has to perform a high-speed access control with patterns having various comparison targets and complex combinations of these comparison targets. This is because, in an access control with patterns having restricted comparison targets and restricted combinations of these comparison targets, functions of the access control are restricted and processing by a higher-level processor is required.

In this regard, in the CAM type, the comparison targets are restricted by the width of memory, and the combinations of the comparison targets are also restricted by the width of memory (refer to FIG. 15A). Therefore, the CAM type cannot achieve an access control with various and complex patterns. On the other hand, in the FF circuit type, the comparison targets and the combinations of the comparison targets are not restricted by the width of memory. However, diversification of the comparison targets invites an increase in the number of comparators, which further invites an increase of a storage unit that stores a rule (refer to FIG. 15B). For this reason, in the FF circuit type, a reduction in circuitry size cannot be achieved, even though an access control with various and complex patterns can be achieved.

SUMMARY

It is an object of the present invention to at least partially solve the problems in the conventional technology.

According to an aspect of an embodiment, a packet transfer controlling apparatus includes a code storage unit that stores, for each of a plurality of comparing units that outputs a comparison result of indicating whether information selected from information included in an input packet as information that belongs to a classification and a comparison value set as a comparison target for the information that belongs to the classification match each other, a plurality of associations of a code and the classification to be compared by the comparing unit when specification of the code is accepted; and a plurality of selecting units that sets, when specification of the code is accepted, the information that belongs to the classification stored in the code storage unit in association with the code for the comparing unit that performs a subsequent process as information to be selected from the information included in the input packet, and selects, when the input of the packet is accepted, the information that belongs to the classification from the information included in the packet, wherein the plurality of comparing units outputs a comparison result of determining whether the information selected by the selecting unit that performs a preceding process and the comparison value set as the comparison target for the selected information match each other, and further includes a rule searching unit that searches, when the comparison results are output from all of the comparing units, for a plurality of rules that each set a matching relation through logical AND regarding each classification, the matching relation indicating whether the information that belongs to the classification and the comparison value match each other to find which rule corresponds to the input packet, and outputs identification information that identifies the found rule; and a transfer controlling unit that controls transfer of the packet based on the identification information output by the rule searching unit.

According to another aspect of an embodiment, a packet transfer controlling method includes providing a code storage unit configured to store a plurality of associations of a code and a classification to be compared by a comparing step when specification of the code is received; searching, in the code storage unit, for the information that belongs to the classification stored in association with the code for the comparing step to be performed as a subsequent process, the comparing step outputting, when specification of the code is received, a comparison result of indicating whether information selected from information included in an input packet as information that belongs to the classification and a comparison value set as a comparison target for the information that belongs to the classification match each other; setting the information searched for as information to be selected from the information included in the input packet; and selecting, when the input of the packet is received, the information that belongs to the classification from the information included in the packet, wherein the comparing step outputs the comparison result of indicating whether the information selected by the selecting step performed as a preceding process and the comparison value set as the comparison target for the selected information match each other, and further includes searching, when the comparison results are output by the comparing step, for a plurality of rules that each set a matching relation through logical AND regarding each classification, the matching relation indicating whether the information that belongs to the classification and the comparison value match each other to find which rule corresponds to the input packet, and outputting identification information that identifies the found rule; and controlling transfer of the packet based on the output identification information.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3 is a drawing for explaining a code storage unit;

DETAILED DESCRIPTION OF THE PREFERRED EMBODIMENTS

With reference to the attached drawings, exemplary embodiments of the packet transfer controlling apparatus and packet transfer controlling method according to the present invention are explained in detail below. Note that, in the following, a general outline of a packet transfer controlling apparatus according to a first embodiment is first explained, and then the configuration, process procedure, and effects of the packet transfer controlling apparatus according to the first embodiment are explained. Then, the packet transfer controlling apparatus according to a second embodiment and third embodiment as other embodiments will be explained.

Figure 1:
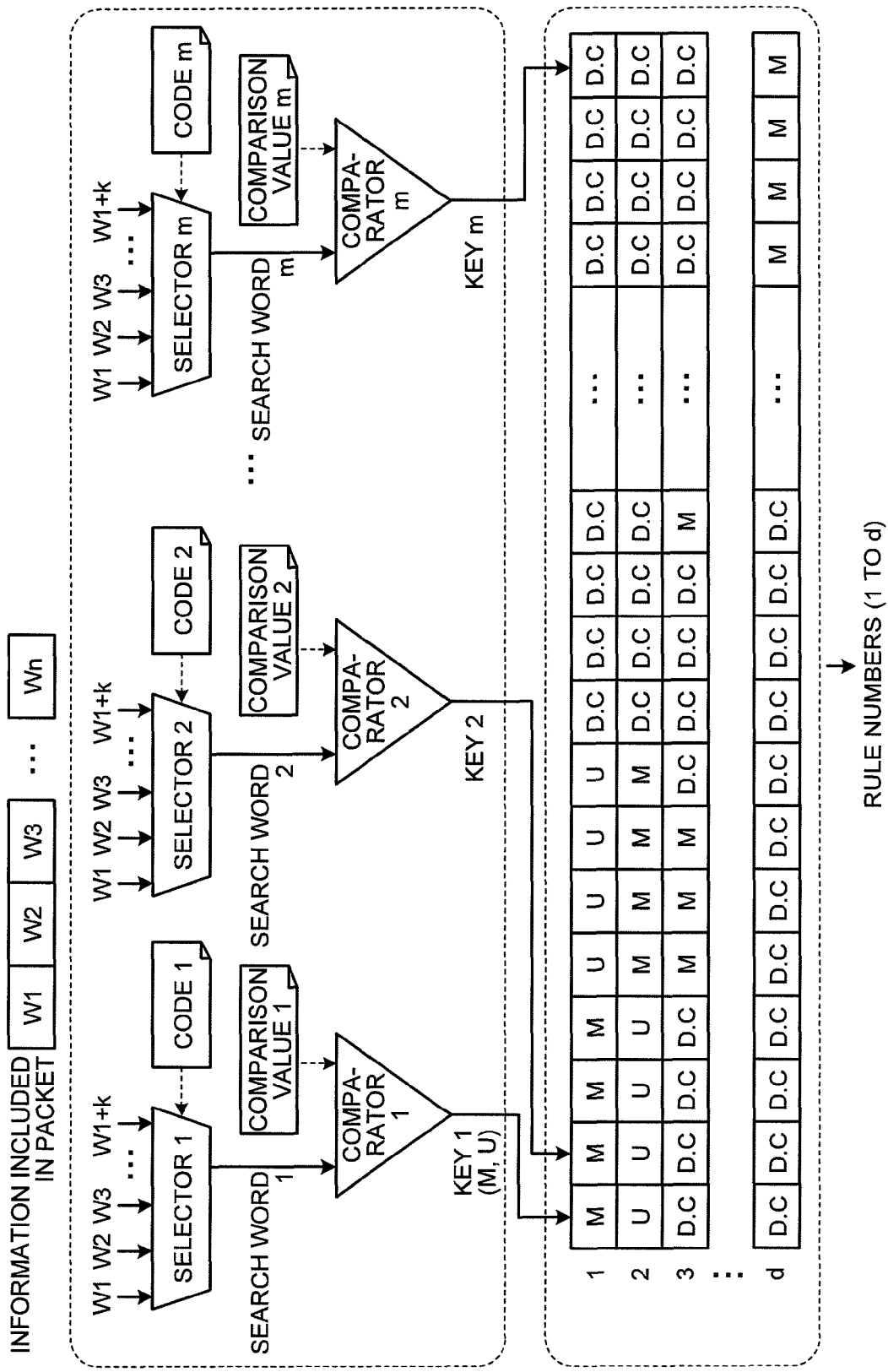
FIG. 1 is a drawing for explaining a general outline of a packet transfer controlling apparatus according to a first embodiment.

First, by using FIG. 1, the general outline of the packet transfer controlling apparatus according to the first embodiment is explained. FIG. 1 is a drawing for explaining the general outline of the packet transfer controlling apparatus according to the first embodiment.

In general, the packet transfer controlling apparatus has a rule table and an action list (not shown) stored in advance. The rule table is set with, for example, a rule of "a packet with a transmission-destination address "192.168.170.0"". The action list is set with, for example, an action of "discard the packet without transfer". With the rule table and the action list being stored in association with each other, the packet transfer controlling apparatus stores a policy of "discard the packet without transfer when the transmission-destination address of the input packet is "192.168.170.0"".

In brief, upon accepting an input of a packet, the packet transfer controlling apparatus first extracts information from the packet, and searches for a rule by using the extracted information. For example, upon accepting an input of a packet, the packet transfer controlling apparatus extracts transmission-destination address information of "192.168.170.0" from the packet, and searches for a rule by using the extracted transmission-destination address information of "192.168.170.0". The packet transfer controlling apparatus then controls packet transfer according to an action stored in association with the found rule. For example, the packet transfer controlling apparatus searches for an action of "discard the packet without transfer" and discards the packet.

Meanwhile, the packet transfer controlling apparatus has to perform the series of processes explained above at high speed. Specifically, the packet transfer controlling apparatus performs a process of extracting information from a packet and searching for a rule by using the extracted information at high speed. For this purpose, as depicted in FIG. 1, the packet transfer controlling apparatus according to the first embodiment implements the process of extracting information from a packet and searching for a rule by using the extracted information by hardware.

First, as depicted in FIG. 1, the packet transfer controlling apparatus according to the first embodiment stores rules identified by rule numbers (1 to d). Also, as depicted in FIG. 1, each rule in the first embodiment is set with a ternary value of "M", "U", and "D. C". "M" means "Match", indicating "matching". "U" means "Unmatch", indicating "not matching". "D. C" means "Don't Care", indicating "disregard". The packet transfer controlling apparatus according to the first embodiment uses two bits to describe a ternary, thereby setting a rule. Also, the packet transfer controlling apparatus sets a rule with logical AND for a ternary value.

Next, as depicted in FIG. 1, the packet transfer controlling apparatus according to the first embodiment compares each ternary value set in a rule with each of the comparison results output from the comparators, thereby searching for a rule. Here, each comparator outputs a comparison result ("M" or "U") indicating whether the information selected from the input packet as information that belongs to a predetermined classification matches a comparison value set as a comparison target for the information. In other words, the rule is described according to each selection from the comparison values set in each comparator and patterns of combination.

If so, in the packet transfer controlling apparatus according to the first embodiment, how an access control with various and complex patterns is achieved relates to how each comparator is implemented. Here, achieving an access control with various and complex patterns means that a rule according to a pattern can be described even with various and complex selections of information from the information included in the packet to be matched as a comparison target and various and complex combinations of the selected comparison targets.

Here, for example, the packet transfer controlling apparatus can use a technique of increasing the number of comparators to achieve an access control with various and complex patterns. According to the technique of increasing the number of comparators, selection of a comparison target can be diversified, and also combinations of the comparison targets can be made complex. However, an increase in the number of comparators is nothing but an increase in circuitry size. After all, in the technique of increasing the number of comparators, a reduction in circuitry size cannot be achieved, although a reduction in access control with various and complex patterns.

To get around this, as depicted in FIG. 1, the packet transfer controlling apparatus according to the first embodiment includes a selector before each comparator, thereby achieving a reduction in circuitry size and an access control with various and complex patterns both.

Specifically, firstly, for each of the plurality of comparators, the packet transfer controlling apparatus according to the first embodiment stores a plurality of associations of a code and a classification to be compared by the comparator when specification of the code is accepted (omitted in FIG. 1). Thus, when specification of the code is accepted, each selector sets information that belongs to the classification stored for the comparator that performs a subsequent process in association with the code whose specification has been accepted as information to be selected from the information included in the input packet. Then, when accepting an input of a packet, each selector selects the information that belongs to the set classification from the information included in the packet.

For example, as depicted in FIG. 1, when specification of a code 1 is accepted, a selector 1 sets information that belongs to a classification stored for a comparator 1 in association with the code 1 as information to be selected from information (W1, W2, W3, . . . , W1+k) included in the input packet. Then selector 1 selects the information that belongs to the set classification and outputs a search word 1.

On the other hand, each comparator outputs a comparison result indicating whether the information selected by the selector that performs a preceding process matches a comparison value set as a comparison target for the information. For example, as depicted in FIG. 1, the comparator 1 outputs a key 1 ("M" or "U") as a comparison result indicating whether the search word 1 selected by the selector 1 matches a comparison value 1.

Then, the comparison results are output from all of the comparators, the packet transfer controlling apparatus according to the first embodiment conducts a search to see which rule the input packet is relevant to among the plurality of rules, and then outputs a rule number that identifies the found rule.

In this manner, the packet transfer controlling apparatus according to the first embodiment includes a selector before the comparator. Only by accepting specification of a code, the information to be selected by the selector is changed, and the comparison target to be compared with by the comparator is changed. In other words, only by accepting specification of a code, the packet transfer controlling apparatus according to the first embodiment allows comparisons with a plurality of comparison targets as many as the number of codes by a single comparator, thereby achieving an access control with patterns of various comparison targets. Also, with the packet transfer controlling apparatus according to the first embodiment including such comparators in parallel, an access control with patterns of complex combinations of comparison targets can be achieved. In this manner, the packet transfer controlling apparatus according to the first embodiment can achieve a reduction in circuitry size and an access control with various and complex patterns both.

Figure 2:
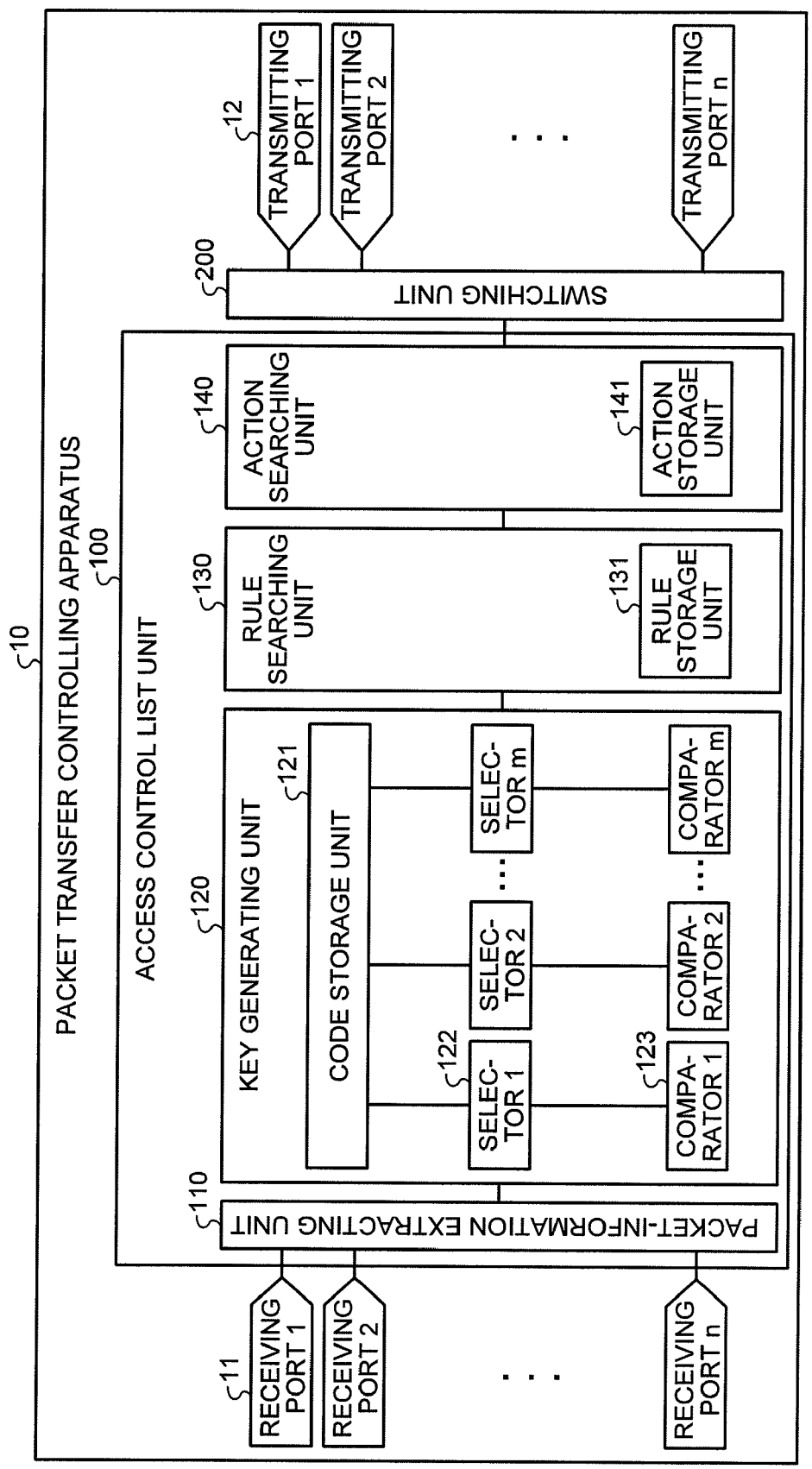
FIG. 2 is a block diagram of the configuration of the packet transfer controlling apparatus according to the first embodiment.

Next, by using FIGS. 2 and 3, the configuration of the packet transfer controlling apparatus according to the first embodiment is explained. FIG. 2 is a block diagram of the configuration of the packet transfer controlling apparatus according to the first embodiment. FIG. 3 is a drawing for explaining a code storage unit according to the first embodiment.

As depicted in FIG. 2, a packet transfer controlling apparatus 10 includes, among other things, receiving ports 11, transmitting ports 12, an access control list unit 100, and a switching unit 200.

Each of the receiving ports 11 receives a packet. Each of the transmitting ports 12 transmits a packet. When an action is transferred from the access control list unit 100, the switching unit 200 controls packet transfer according to the transferred action, such as transmitting the packet to a relevant one of the transmitting ports 12 or discarding the packet.

As depicted in FIG. 2, the access control list unit 100 includes, among other things, a packet-information extracting unit 110, a key generating unit 120, a rule searching unit 130, an action searching unit 140.

The packet-information extracting unit 110 extracts information included in a packet. Specifically, upon accepting an input of a packet from any of the receiving ports 11, the packet-information extracting unit 110 extract, from the packet, information included in the packet, and then transfers the information to the key generating unit 120.

The key generating unit 120 generates a key for searching for a rule and, as depicted in FIG. 2, includes, among other things, a code storage unit 121, selectors 122, and comparators 123.

For each of the comparators 123, the code storage unit 121 stores a plurality of associations of a code and a classification to be compared by the comparator 123 when specification of the code is accepted. For example, the code storage unit 121 stores information as depicted in FIG. 3. For example, for "comparator 1", the code storage unit 121 stores an association with a code "1" and a classification "DA[15:0]" (DA: Destination Address).

When specification of a code is accepted, each of the selectors 122 searches for the code storage unit 121 for the comparator 123 that performs a subsequent process. The selector 122 then sets information that belongs to the classification stored in association with the code whose specification has been accepted as information to be selected from the information included in the input packet. Also, when an input of a packet is accepted, the selector 122 selects information that belongs to the set classification from the information included in the packet, and outputs the selected information as a search word.

For example, when specification of a code "1" is accepted, the selector 122 searches the code storage unit 121 for the comparator 123 that performs a subsequent process, and sets "DA[15:0]" as information to be selected from the information included in the input packet. Also, when an input of a packet is accepted, the selector 122 selects information belongs to "DA[15:0]" from the information included in the packet. That is, the selector 122 selects a 0-th bit through a fifteenth bit of a transmission destination address from among the information included in the packet, and outputs the bit as a search word.

The comparator 123 makes a comparison to see whether the information selected by the selector 122 that performs a preceding process matches the comparison value set as a comparison target for the information, and outputs the comparison result as a key. For example, the comparator 123 makes a comparison to see whether the transmission destination address selected by the selector 122 matches the comparison value (a value of a specific transmission destination address), and outputs a key of "M" or "U".

The rule searching unit 130 searches for a rule by using the key. Specifically, as depicted in FIG. 2, the rule searching unit 130 includes a rule storage unit 131. The rule storage unit 131 stores, for example, rules as depicted in FIG. 1. That is, in each rule, a matching relation indicating whether information that belongs to a predetermined classification matches a comparison value is set through logical AND for each classification.

Also, when the comparison results are output from all of the comparators 123, the rule searching unit 130 conducts a search to see which rule the input packet is relevant to among the plurality of rules stored in the rule storage unit 131. As a result, the rule searching unit 130 will search for a rule matching with the comparison result or a rule described in logical AND of "Don't care". The rule searching unit 130 then outputs a rule number that identifies the found rule.

The action searching unit 140 searches for an action by using the rule number. Specifically, the action searching unit 140 includes an action storage unit 141 as depicted in FIG. 2. The action storage unit 141 stores, for example, a plurality of associations of a rule number and an action, such as "discard the packet without transfer".

Also, when the rule number is output by the rule searching unit 130, the action searching unit 140 searches the action storage unit 141 by using the output rule number to obtain an action stored in association with the rule number. The action searching unit 140 then transfers the obtained action to the switching unit 200.

Figure 4:
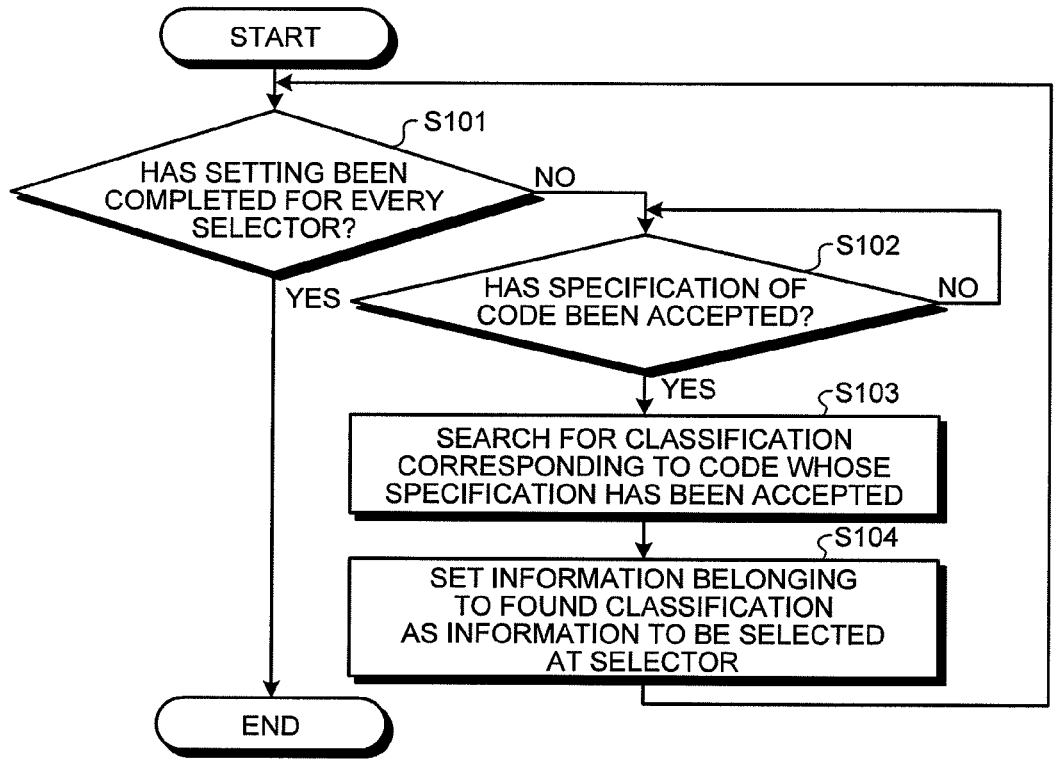
FIG. 4 is a flowchart of the procedure of a selector setting process.
Figure 5:
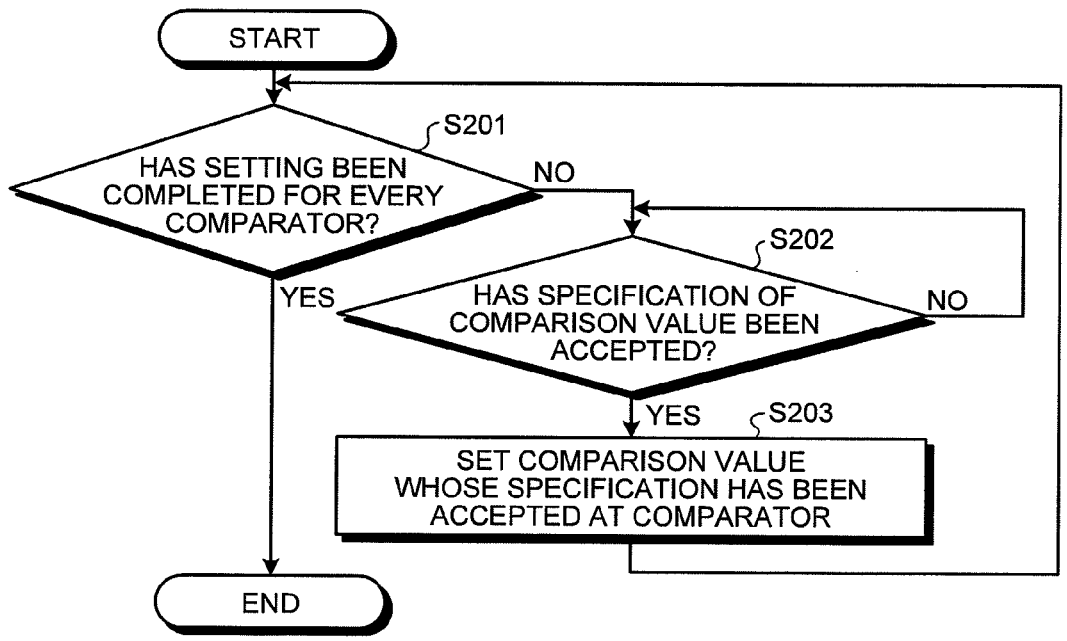
FIG. 5 is a flowchart of the procedure of a comparator setting process.
Figure 6:
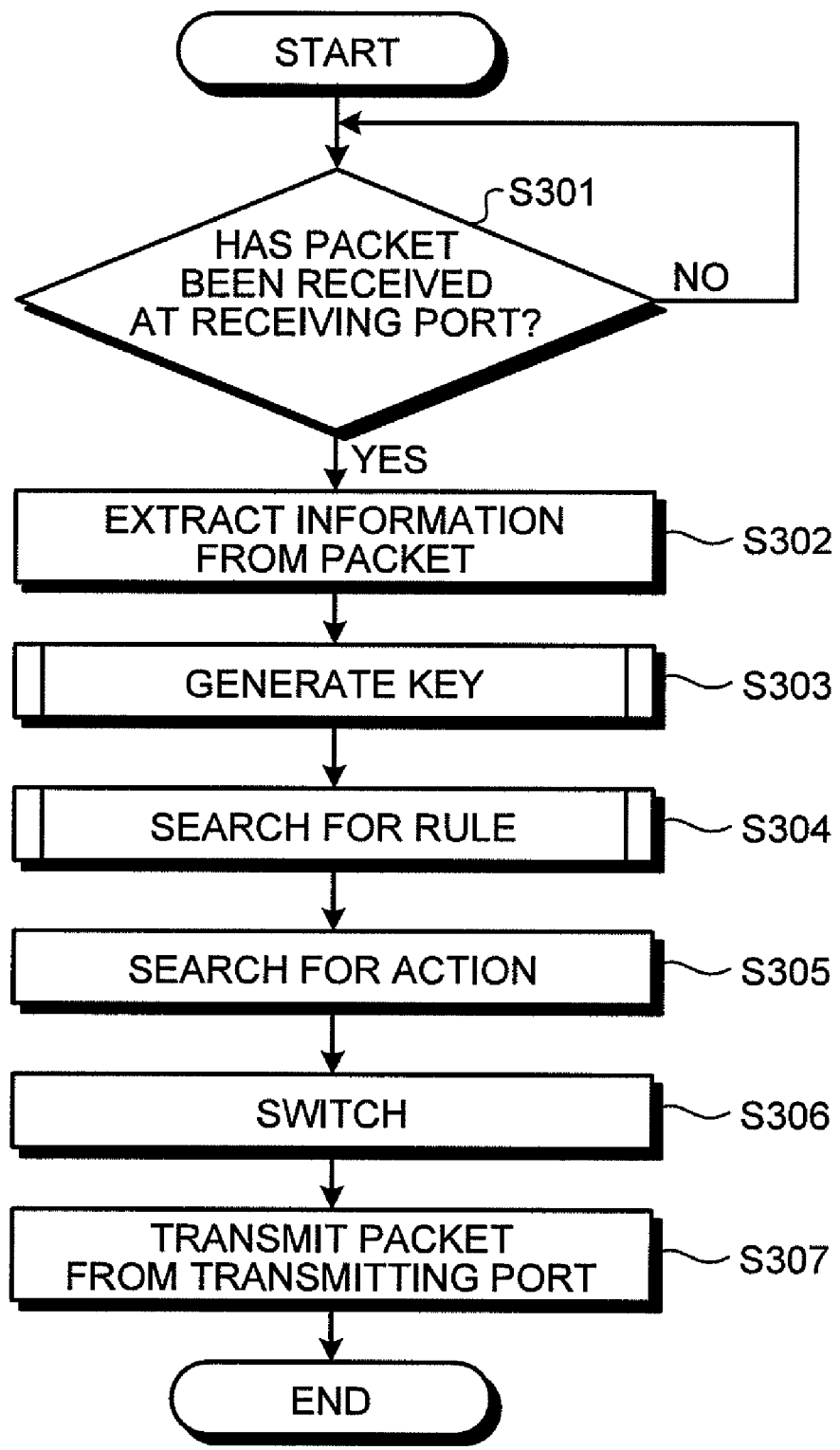
FIG. 6 is a flowchart of the (entire) procedure of a packet transfer controlling process.
Figure 7:
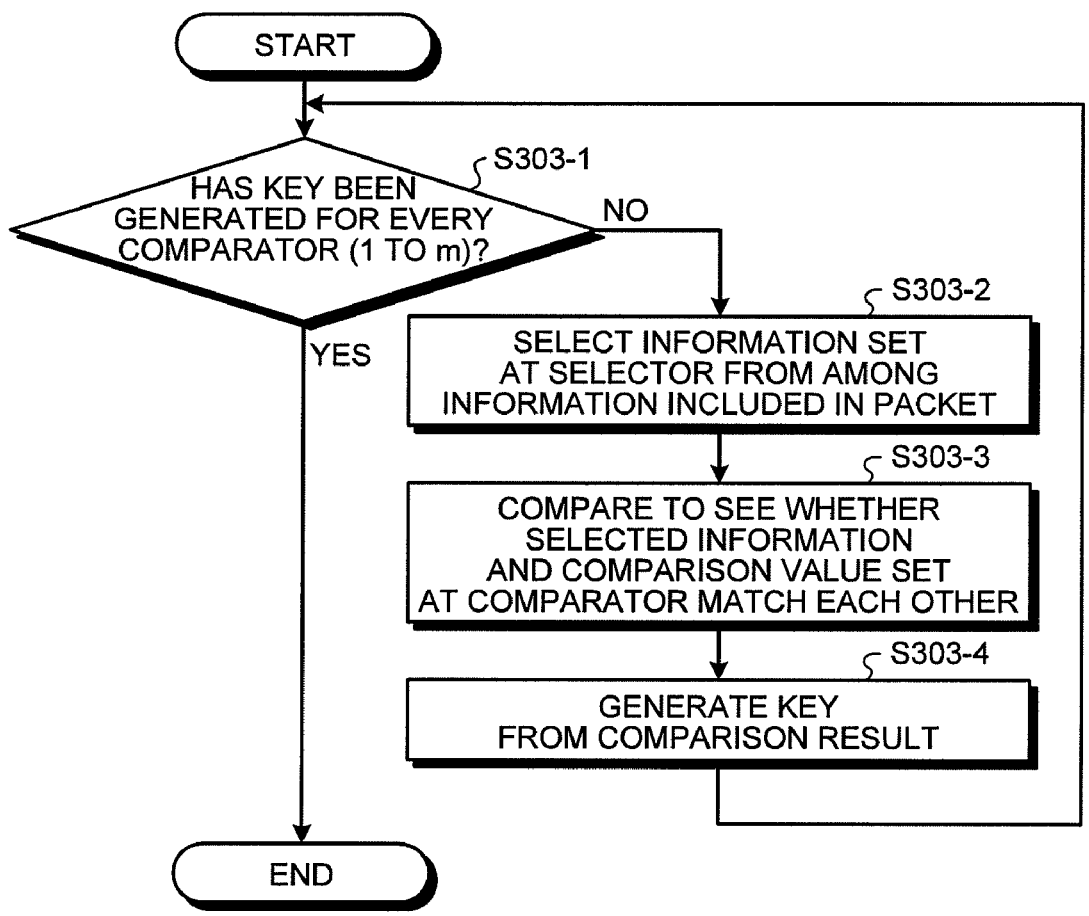
FIG. 7 is a flowchart of the procedure of a key generating process.
Figure 8:
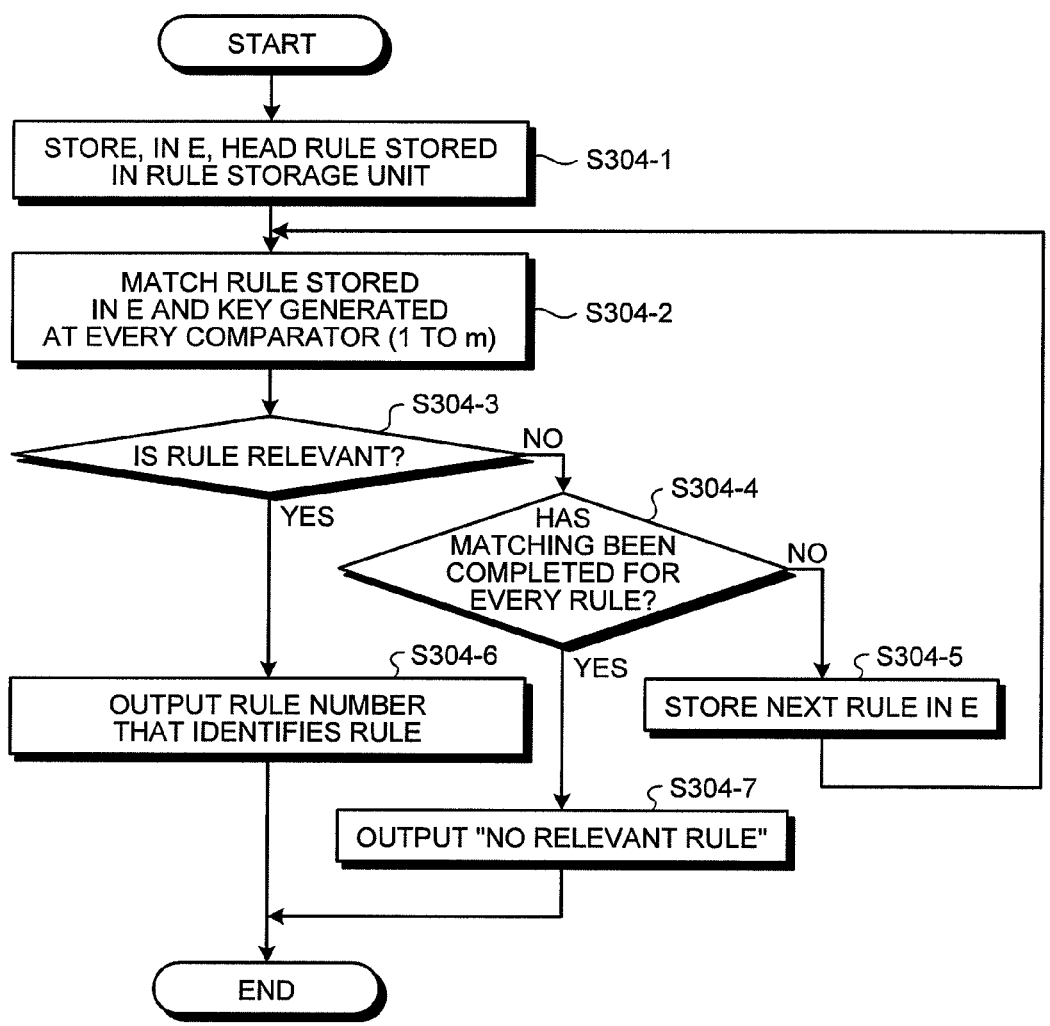
FIG. 8 is a flowchart of the procedure of a rule searching process.

Next, by using FIGS. 4 to 8, the process procedure by the packet transfer controlling apparatus according to the first embodiment is explained. FIG. 4 is a flowchart of the procedure of a selector setting process. FIG. 5 is a flowchart of the procedure of a comparator setting process. FIG. 6 is a flowchart of the (entire) procedure of a packet transfer controlling process. FIG. 7 is a flowchart of the procedure of a key generating process. FIG. 8 is a flowchart of the procedure of a rule searching process.

First, referring to FIG. 4, the key generating unit 120 determines whether setting has been completed for every selector 122 (Step S101). When it is determined that setting has been completed (Yes at Step S101), the key generating unit 120 ends the process.

On the other hand, when it is determined that setting has not been completed for every selector 122 (No at Step S101); the key generating unit 120 determines whether specification of a code has been accepted (Step S102). When it is determined that specification has not been accepted (No at Step S102), the key generating unit 120 waits for specification of a code.

On the other hand, when it is determined that specification has been accepted (Yes at Step S102), the key generating unit 120 searches for a classification corresponding to the code whose specification has been accepted (Step S103). Specifically, the key generating unit 120 searches for the code storage unit 121 by using the code whose specification has been accepted to search for a classification stored in association with the code whose specification has been accepted.

The key generating unit 120 then sets, at the selector 122, information that belongs to the found classification as information to be selected (Step S104). The key generating unit 120 then returns to the process of determining whether setting has been completed for every selector 122.

Referring to FIG. 5, the key generating unit 120 first determines whether setting has been completed for every comparator 123 (Step S201). When it is determined that setting has been completed (Yes at Step S201), the key generating unit 120 ends the process.

On the other hand, when it is determined that setting has not been completed for every comparator 123 (No at Step S201); the key generating unit 120 then determines whether specification of a comparison value has been accepted (Step S202). When it is determined that specification of a comparison value has not been accepted (No at Step S202), the key generating unit 120 waits for specification of a comparison value.

On the other hand, when it is determined that specification of a comparison value has been accepted (Yes at Step S202), the key generating unit 120 sets, at the comparator 123, the comparison value whose specification has been accepted (Step S203). The key generating unit 120 then returns to the process of determining whether setting has been completed for every comparator 123.

Referring to FIG. 6, the packet-information extracting unit 110 first determines whether a packet has been received at any of the receiving ports 11 (Step S301). When it is determined that no packet has been received (No at Step S301), the packet-information extracting unit 110 waits for reception of a packet.

On the other hand, when it is determined that a packet has been received (Yes at Step S301), the packet-information extracting unit 110 extracts information form the input packet and transfers the extracted information to the key generating unit 120 (Step S302).

Next, the key generating unit 120 generates a key and transfers the key to the rule searching unit 130 (Step S303). Next, the rule searching unit 130 searches for the rule storage unit 131 by using the key, and transfers the rule number of the found rule to the action searching unit 140 (Step S304).

The action searching unit 140 then searches the action storage unit 141 by using the rule number, and transfers the found action to the switching unit 200 (Step S305).

The switching unit 200 then controls packet transfer according to the transferred action. For example, the switching unit 200 switches the packet (Step S306), and transmits the packet from the transmitting port 12 (Step S307).

Referring to FIG. 7, the key generating unit 120 first determines whether a key has been generated for every comparator 123 (Step S303-1). When it is determined that a key has been generated (Yes at Step S303-1), the key generating unit 120 ends the process.

On the other hand, when it is determined that a key has not been generated (No at Step S303-1), the key generating unit 120 selects information set at the selector 122 from among the information included inn the packet (Step S303-2).

The key generating unit 120 then compares to see whether the selected information and the comparison value set at the comparator 123 match each other (Step S303-3).

The key generating unit 120 then generates a key from the comparison result for output (Step S303-4). The key generating unit 120 then returns to the process of determining whether a key has been generated for every comparator 123.

Referring to FIG. 8, the rule searching unit 130 first stores, in E (entry), the head rule stored in the rule storage unit 131 (Step S304-1).

Next, the rule searching unit 130 matches a rule stored in E and the key generated at every comparator 123 (Step S304-2).

The rule searching unit 130 then determines the rule is relevant (Step S304-3). When it is determined that the rule is relevant (Yes at Step S304-3), the rule searching unit 130 outputs a rule number that identifies the rule (Step S304-6), and then ends the process.

On the other hand, when it is determined that the rule is not relevant (No at Step S304-3), the rule searching unit 130 determines whether matching has been completed for every rule (Step S304-4). When it is determined that matching has been completed for every rule (Yes at Step S304-4), the rule searching unit 130 outputs "No relevant rule" (Step S304-7), and then ends the process.

On the other hand, when it is determined matching has not been completed for every rule (No at Step S304-4), the rule searching unit 130 stores the next rule in E (Step S304-5), and then returns to the process of matching a rule stored in E and a key.

As has been explained above, according to the first embodiment, for each of the plurality of comparators, the packet transfer controlling apparatus stores a plurality of associations of a code and a classification to be compared by the comparator when specification of the code is accepted. Also, each of the selectors sets the information that belongs to the classification stored in association with the accepted code as information to be selected from the packet. Each of the selectors selects the set information when an input of a packet is accepted. Each of the comparators outputs the comparison result indicating whether the information selected by each selector match the comparison value. When the comparison results are output from all of the comparators, the rule searching unit conducts a search to see which rule the packet is relevant to among the plurality of rules, and outputs a rule number.

From the above, the packet transfer controlling apparatus according to the first embodiment includes a selector before the comparator. Only by accepting specification of a code, the information to be selected by the selector is changed, and the comparison target to be compared with by the comparator is changed. In other words, only by accepting specification of a code, the packet transfer controlling apparatus according to the first embodiment allows comparisons with a plurality of comparison targets as many as the number of codes by a single comparator, thereby achieving an access control with patterns of various comparison targets. Also, with the packet transfer controlling apparatus according to the first embodiment including such comparators in parallel, an access control with patterns of complex combinations of comparison targets can be achieved. In this manner, the packet transfer controlling apparatus according to the first embodiment can achieve a reduction in circuitry size and an access control with various and complex patterns both.

That is, according to the first embodiment, with a flip-flop circuit type, a high-speed process is possible. Also, according to the first embodiment, with a code selecting type, in addition to various pattern representations, the circuitry size can be compressed into "1/the number of codes". Furthermore, according to the first embodiment, a rule search is performed by a combination of keys, thereby allowing matching of patterns that are complex by the width of the rule table.

The packet transfer controlling apparatus according to the first embodiment assumes that the rule stored in the rule storage unit 131 is set with a ternary value of "M", "U", and "D.C". Therefore, in the packet transfer controlling apparatus according to the first embodiment, two bits are used to describe a ternary value, thereby setting a rule. In this regard, in a packet transfer controlling apparatus according to a second embodiment, one bit is used to describe a binary value ("M" and "D.C"), thereby setting a rule with the size of the rule storage unit 131 being reduced by half. A general outline and process procedure of the packet transfer controlling apparatus according to the second embodiment is explained in sequence below.

Figure 9:
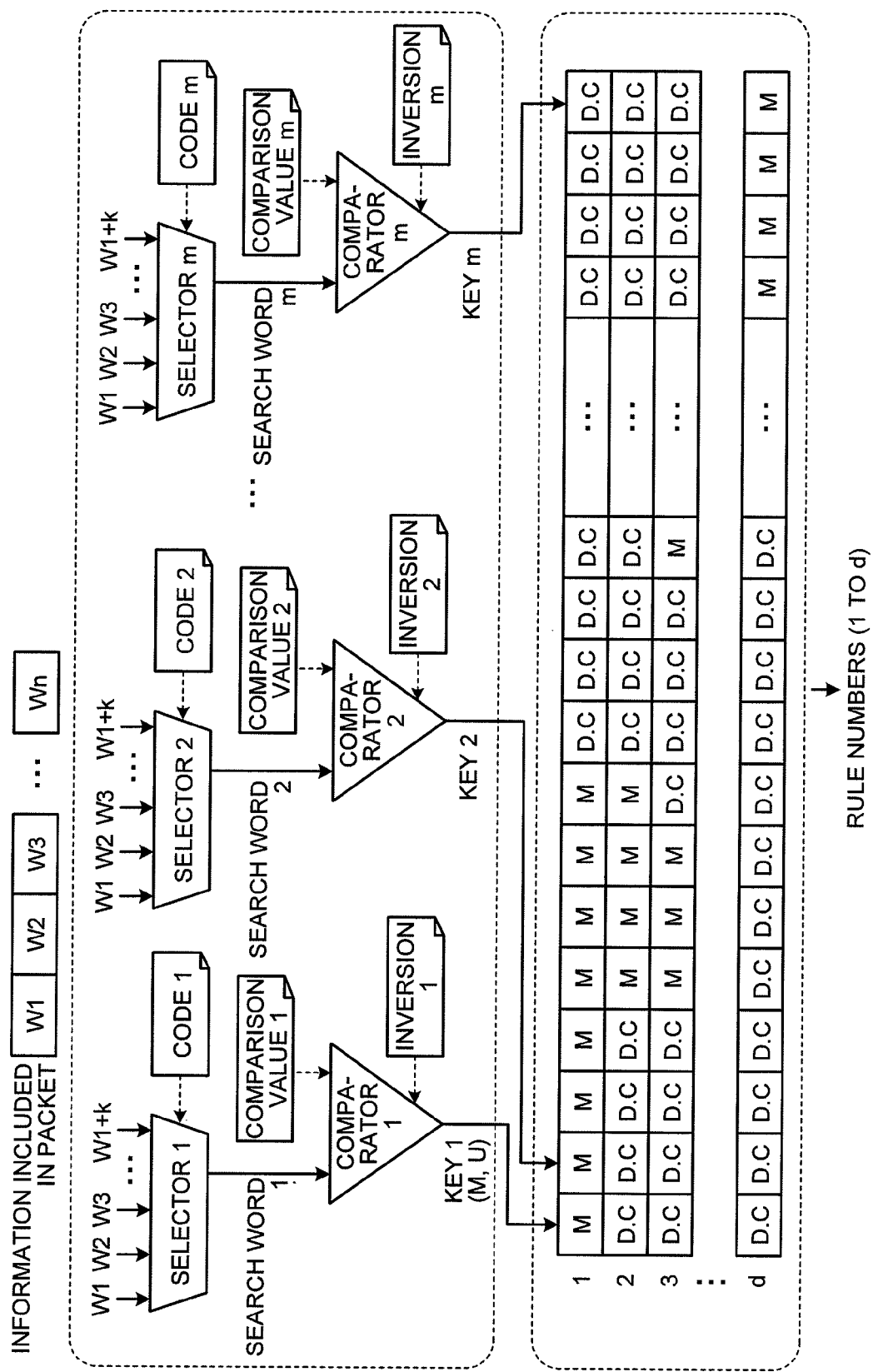
FIG. 9 is a drawing for explaining a general outline of a packet transfer controlling apparatus according to a second embodiment.

First, by using FIG. 9, the general outline of the packet transfer controlling apparatus according to the second embodiment is explained. FIG. 9 is a drawing for explaining the general outline of the packet transfer controlling apparatus according to the second embodiment.

As depicted in FIG. 9, the packet transfer controlling apparatus according to the second embodiment is different from the packet transfer controlling apparatus according to the first embodiment (refer to FIG. 1) in that a comparator accepts an inverting instruction and every rule is described with only "M" and "D.C". Note that, for the purpose of explanation, every comparator appears to accept an inverting instruction in FIG. 9, but this is not meant to be restrictive. The packet transfer controlling apparatus sets an inverting instruction at any comparator according to the setting of a pattern or rule as appropriate.

Here, when accepting an instruction for inverting the comparison result output from the comparator, the comparator in the second embodiment outputs the comparison result after inversion. Specifically, in the case of a comparison result indicating that the information selected by the selector and the comparison value match each other ("M"), the comparison result is inverted to a comparison result indicating that they do not match each other ("U"), and then outputs the key. Also, in the case of a comparison result indicating that the information selected by the selector and the comparison value do not match each other ("U"), the comparison result is inverted to a comparison result indicating that they match each other ("M"), and then outputs the key.

A technological significance is as follows. For example, assume that the packet transfer controlling apparatus performs a control such that "discard the packet without transfer when the transmission destination address of the input packet is not "A"". In the packet transfer controlling apparatus according to the first embodiment, the selector selects the transmission destination address from the information included in the packet, and the comparator compares the selected transmission destination address and the comparison value "A" and outputs a comparison result of "M" or "U". Also, in the packet transfer controlling apparatus according to the first embodiment, the rule storage unit 131 stores a rule described such that a matching relation corresponding to the comparator (comparison value "A") is represented by "U". With this, when the comparison result output from the comparator (comparison value "A") is represented by "U", the packet transfer controlling apparatus according to the first embodiment searches for a rule described such that the matching relation corresponding to the comparator that compares with the comparison value "A" is represented by "U". That is, the packet transfer controlling apparatus according to the first embodiment searches for a rule described such that the matching relation is represented by "U", thereby searching for a rule "the case where the transmission destination address of the input packet is not "A"".

In the packet transfer controlling apparatus according to the second embodiment, as with the first embodiment, the selector selects the transmission destination address from the information included in the packet, and the comparator compares the selected transmission destination address and the comparison value "A" and outputs a comparison result of "M" or "U". Furthermore, the comparison result is inverted before output. That is, if the transmission destination address selected by the selector is not "A", the comparator once determines as a comparison result of "U", and then further inverts the comparison result to "M" for output.

Also, unlike the first embodiment, in the packet transfer controlling apparatus according to the second embodiment, a rule described such that a matching relation corresponding to the comparator (comparison value "A") is represented by "M" is stored in the rule storage unit 131. Then, when the comparison result output from the comparator (comparison value "A") is represented by "M", the packet transfer controlling apparatus according to the second embodiment searches for a rule described such that the matching relation corresponding to the comparator that compares with the comparison value "A" is represented by "M". At this time, "when the comparison result output from the comparator (comparison value "A") is represented by "M"" means that "when the transmission destination address selected by the selector is not "A"". That is, the packet transfer controlling apparatus according to the second embodiment searches for a rule described such that the matching relation is represented by "M", meaning that the apparatus searches for the rule "when the transmission destination address of the input packet is not "A"".

In this manner, in the packet transfer controlling apparatus according to the second embodiment, the comparator accepts an inverting instruction, and inverts the comparison result for output, thereby describing the rule with a binary value ("M" and "D.C"). As a result, the packet transfer controlling apparatus can describe the binary value with one bit, thereby reducing the size of the rule storage unit 131 by half, compared with the rule storage unit 131 in the first embodiment.

Figure 10:
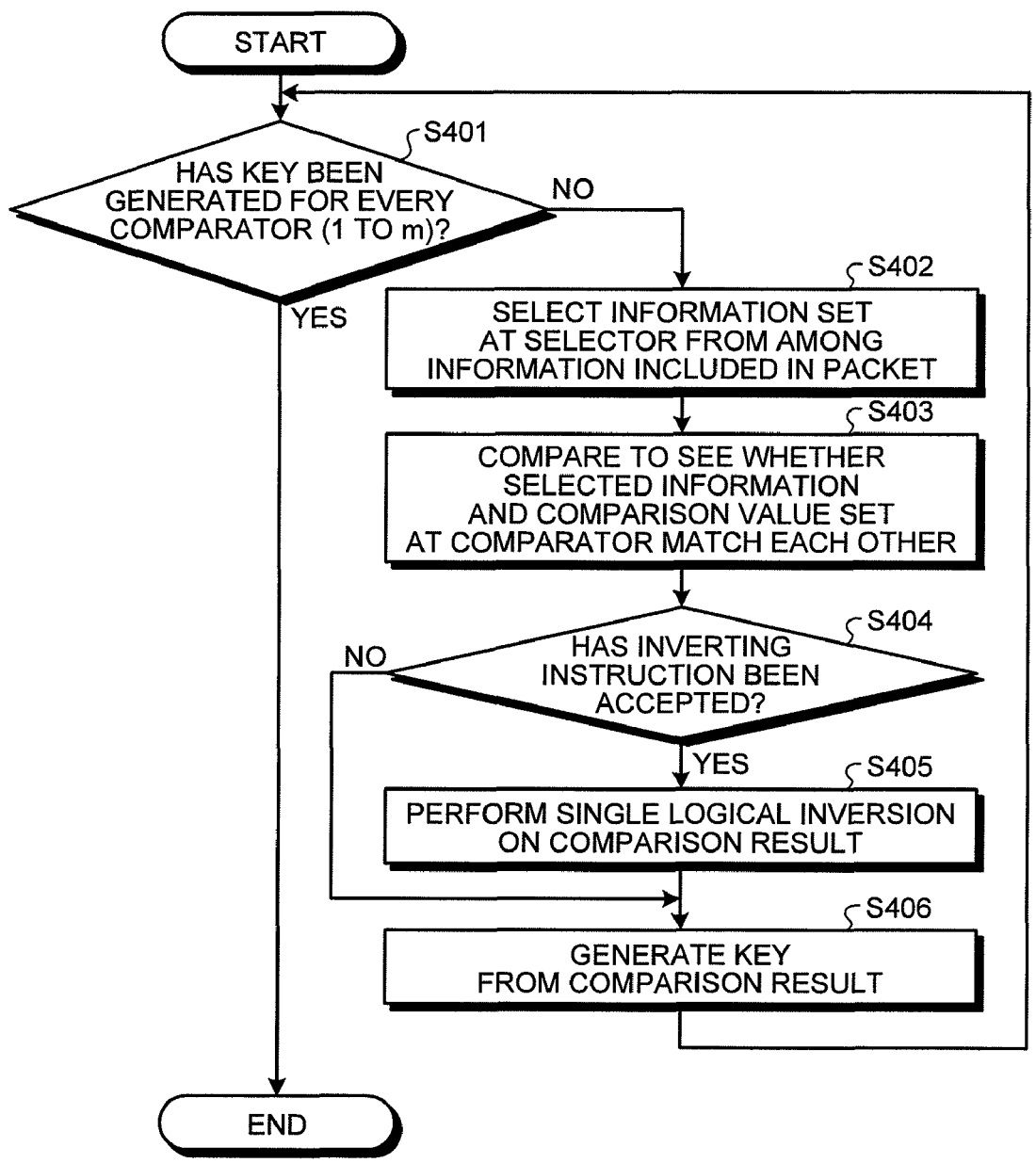
FIG. 10 is a flowchart of the procedure of a key generating process according to the second embodiment.

By using FIG. 10, the procedure of a key generating process according to the second embodiment is explained. FIG. 10 is a flowchart of the procedure of a key generating process according to the second embodiment.

As depicted in FIG. 10, in the key generating process in the second embodiment, as with the first embodiment, the key generating unit 120 first determines whether a key has been generated for every comparator 123 (Step S401). When it is determined that a key has not been generated (No at Step S401), as with the first embodiment, the key generating unit 120 selects information set at the selector 122 from among the information included in the packet (Step S402). Next, as with the first embodiment, the key generating unit 120 makes a comparison to see whether the selected information and the comparison value set at the comparator 123 match each other (Step S403).

Then, unlike the first embodiment, the key generating unit 120 in the second embodiment determines whether an inverting instruction has been accepted (Step S404). When it is determined that an inverting instruction has been accepted (Yes at Step S404), the key generating unit 120 inverts the comparison result (single logical inversion) (Step S405), and generates a key from the inverted comparison result for output (Step S406). Here, single logical inversion means that a logical inversion is performed for a single comparator.

On the other hand, when it is determined that an inverting instruction has not been accepted (No at Step S404), the key generating unit 120 generates a key from the comparison result as it is for output (Step S406). Then, as with the first embodiment, the key generating unit 120 then returns the process of determining whether a key has been generated for every comparator 123.

As explained above, according to the second embodiment, when an instruction for inverting the comparison result output from the comparator is accepted, the comparator inverts a comparison result indicating that the selected information and the comparison value match each other to a comparison result indicating that they do not match each other for output. Also, the comparator inverts a comparison result indicating that the selected information and the comparison value do not match each other to a comparison result indicating that they match each other for output.

From the above, in the packet transfer controlling apparatus according to the second embodiment, the comparator accepts an inverting instruction and inverts the comparison result for output, thereby describing a rule with a binary value ("M" and "D.C"). As a result, the packet transfer controlling apparatus can describe a binary value only by using one bit, thereby reducing the size of the rule storage unit by half, compared with the rule storage unit in the first embodiment.

A packet transfer controlling apparatus according to the third embodiment further includes a function of collectively performing a logical inversion on a plurality of comparators, thereby reducing entry consumption of rules stored in the rule storage unit 131. In the following, a general outline of the packet transfer controlling apparatus according to the third embodiment is explained.

Figure 11:
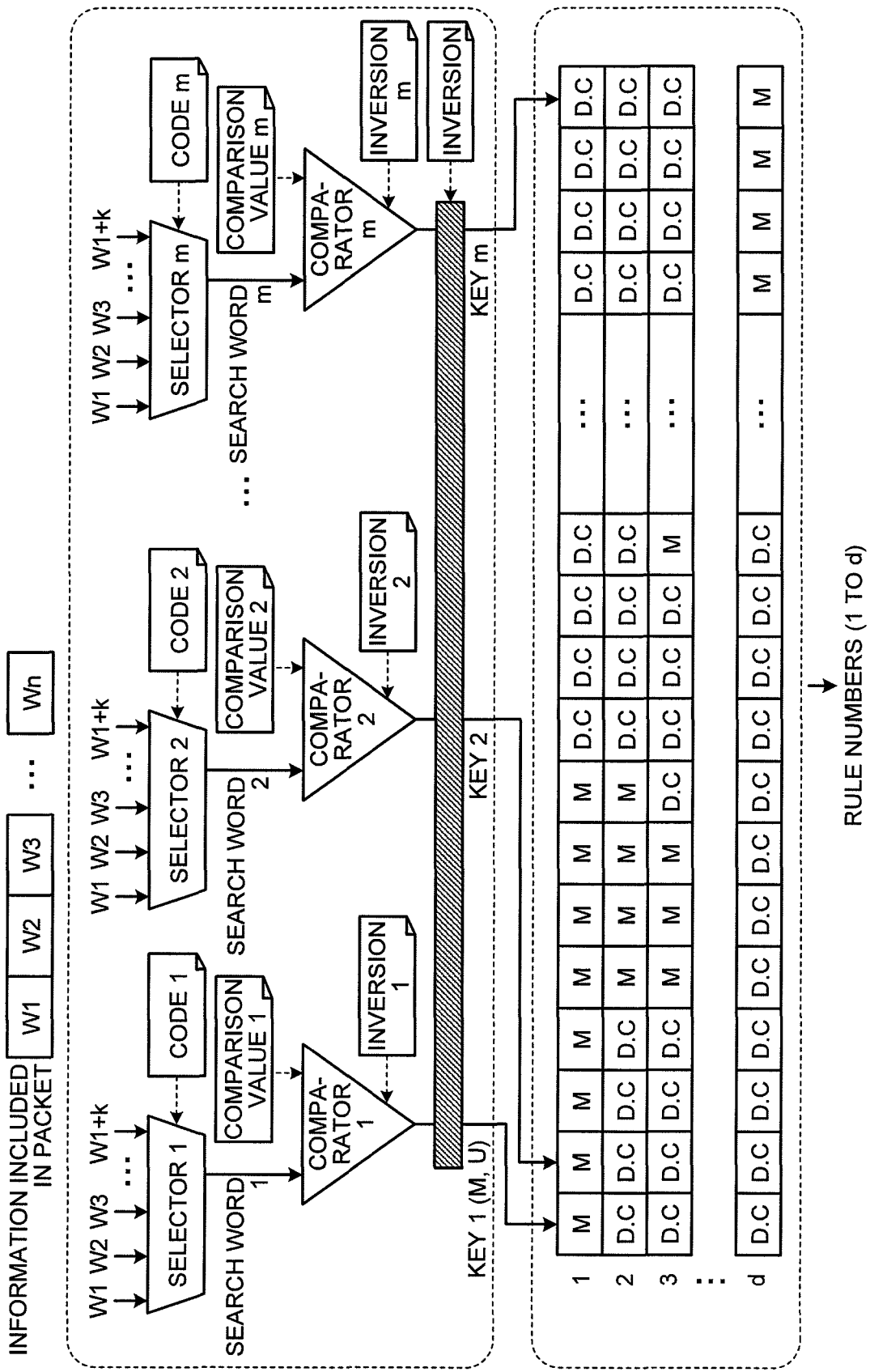
FIG. 11 is a drawing for explaining a general outline of a packet transfer controlling apparatus according to a third embodiment.
Figure 12:
FIG. 12 is a drawing for explaining plural logical inversion.

First, by using FIGS. 11 and 12, the general outline of the packet transfer controlling apparatus according to the third embodiment is explained. FIG. 11 is a drawing for explaining the general outline of the packet transfer controlling apparatus according to the third embodiment. FIG. 12 is a drawing for explaining plural logical inversion.

As depicted in FIG. 11, the packet transfer controlling apparatus according to the third embodiment is different from the packet transfer controlling apparatus according to the second embodiment in that a plural logical inversion is performed on a plurality of comparators and an output after the plural logical inversion is output as a key. In FIG. 11, for the purpose of convenience of explanation, every comparator accepts an instruction for plural logical inversion, but this is not meant to be restrictive. The packet transfer controlling apparatus sets an instruction for plural logical inversion at all or part of the comparators according to the setting of a pattern or rule as appropriate.

The packet transfer controlling apparatus according to the third embodiment assumes that a affirmative matching relation indicating that information that belongs to a predetermined classification and a comparison value match each other has a logical AND relation as for a plurality of classifications, and a negative logical AND that negates the whole logical AND relation has to be set as a rule. For example, the packet transfer controlling apparatus are assumed to set "NOT of "A and B and C"" as a rule.

First, the case is explained in which the packet transfer controlling apparatus according to the second embodiment without a function of plural logical inversion sets "NOT of "A and B and C" as a rule. The rule "NOT of "A and B and C"" can be developed as ""NOT of A" or "NOT of B" or "NOT of C"". Also, when it is assumed that each comparator in the second embodiment accepts an instruction for single logical inversion, the rule of "NOT of "A and B and C"" means "Affirmative of A" or "Affirmative of B" or "Affirmative of C". That is, the rule "NOT of "A and B and C"" is described as "1000" or "0100" or "0010" as three entries, as depicted in FIG. 12.

On the other hand, in the packet transfer controlling apparatus according to the third embodiment, the rule "NOT of "A and B and C"" is described as one entry of "1110", as depicted in FIG. 12. This is because the packet transfer controlling apparatus according to the third embodiment includes a plural logical inverting unit after the key generating unit 120 (before the rule searching unit 130).

When the comparison results are output from all of the comparators, which are targets for plural logical inversion, the plural logical inverting unit converts a bit string of each of the output comparison results by using a bit string with only the classification of an affirmative matching relation being a bit of 1 and other classifications being a bit of 0. For example, the plural logical inverting unit performs conversion by using "1110" with only the classifications of A, B, and C being a bit of 1 and the classification of D being a bit of 0. The plural logical inverting unit then uses an algorithm below to output a bit string with all classifications being a bit of 0 only when all of the classifications of the affirmative matching relation of the comparison results are a bit of 1. Otherwise, the plural logical inverting unit outputs a bit string only when all classifications are a bit of 1. For example, the plural logical inverting unit outputs "000x" only when the comparison result of each comparator is "111x", and otherwise outputs "111x".

| | |
|---|---|
| $K[1..m]$: | key vector |
| $N[1..m]$: | inverted vector (a bit for plural logical inversion is "1") |
| $K'[1..m]$: | key after plural logical inversion |
| $L = |(N\&\sim K)$ | ("|" means OR reduction; "~" means "not") |
| if(L == 1) | $K' = N|(\sim N\&K)$; |
| else | $K' = \sim N\&K$    (1) |

As a result, the rule described as "1110" is always relevant unless the comparison result is "111x". The comparison result of "111x" means that "A and B and C". That is, the rule described as "1110" describes the rule of "NOT" of "A and B and C". A specific example is as below.

$(A=B=1, C=0)$ $K=110x (=>\sim K=001x)$ $N=1110$ $L=|(1110\&001x)=|(0010)=1$ $K'=1110|(\sim 1110\&110x)=111x$    (2)

It is assumed that the comparison result of the comparator that compares with the comparison value "A" is "1 (A)", the comparison result of the comparator that compares with the comparison value "B" is "1 (B)", and the comparison result of the comparator that compares with the comparison value "C" is "0 (NOT C)". In this case, the key vector is "K=110x". Also, an inverted vector is "N=1110".

When "K=110x" and "N=1110" are substituted into the algorithm above, since "L" is OR reduction of logical AND "001x" of "N=1110" and "not K=001x", "1" is obtained. Then, firstly, "K'" is logical AND "000x" of "not N=0001" and "K=110x", and OR of this and "N=1110" is "111x". The same goes for other values. That is, "000x" is output only when the comparison result is "111x". Otherwise, "111x" is output.

Here, by referring to an instruction for single logical inversion stored in the code storage unit, for example, the plural logical inverting unit can perform a plural logical inversion on the comparison results from the relevant comparators. For example, the code storage unit stores "Neg" for comparator 1 and comparator 2. Then, the plural logical inverting unit refers to the code storage unit to perform a plural logical inversion for comparators 1 and 2 set with "Neg".

Figure 13:
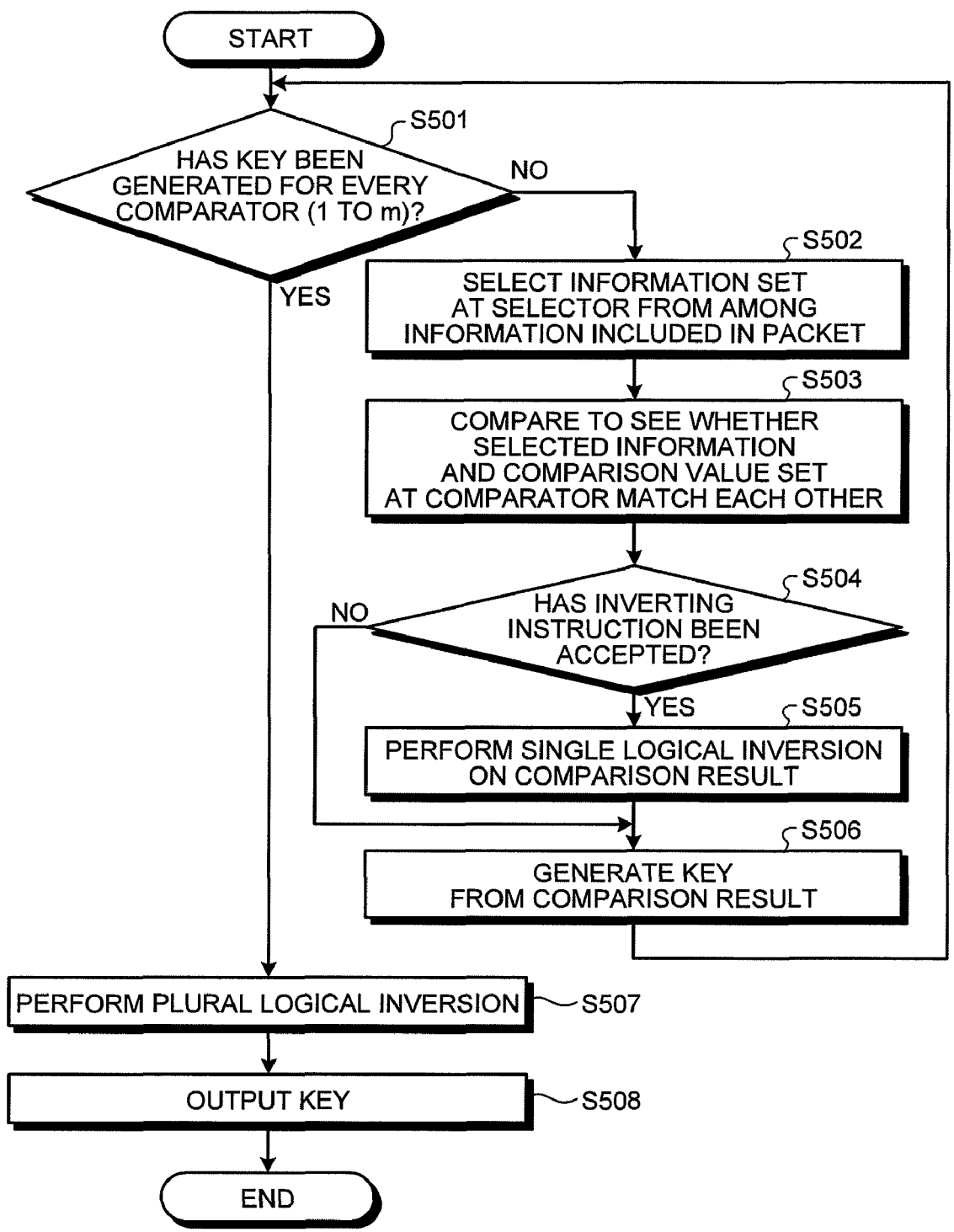
FIG. 13 is a flowchart of the procedure of a key generating process according to the third embodiment.
Figure 14:
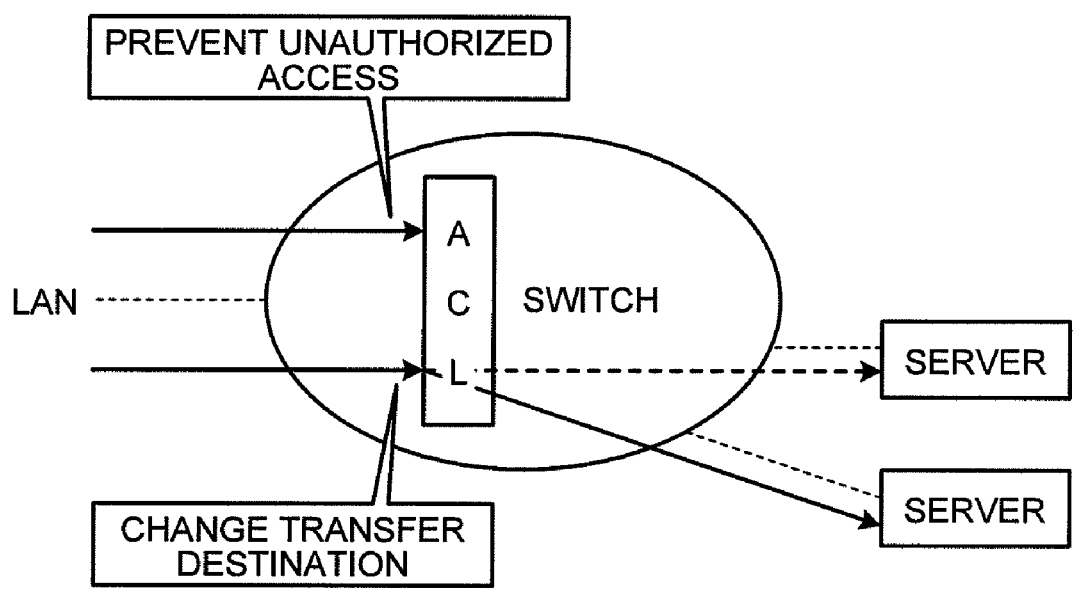
FIG. 14 is a drawing for explaining an access control list.
Figure 15A:
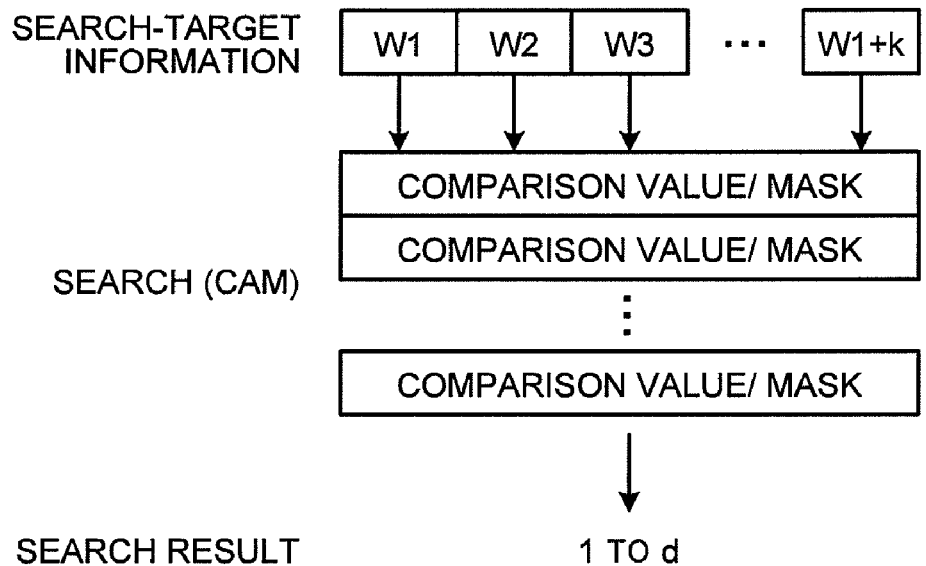
FIGS. 15A and 15B are drawings for explaining conventional technologies.
Figure 15B:
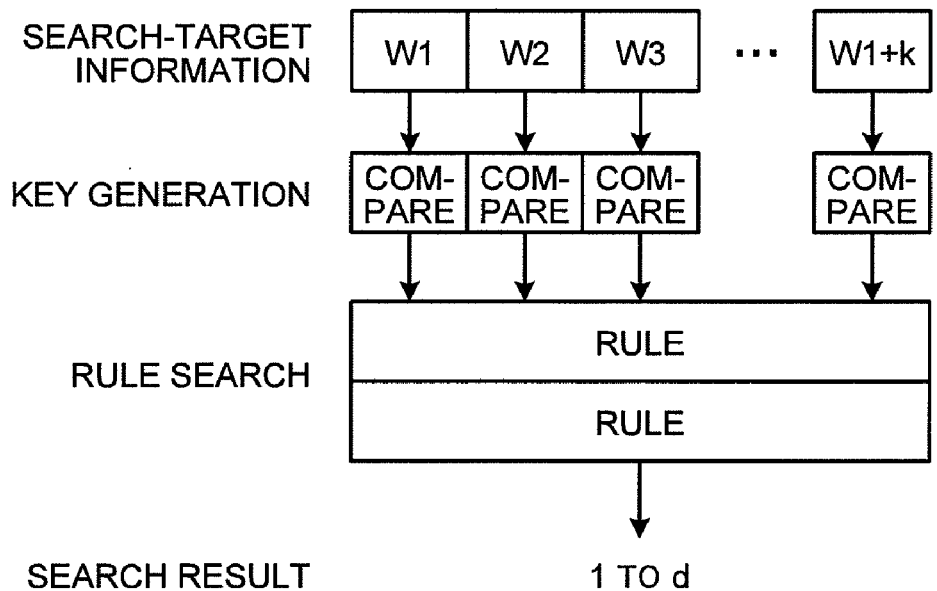

By using FIG. 13, the procedure of a key generating process according to the third embodiment is explained. FIG. 13 is a flowchart of the procedure of a key generating process according to the third embodiment.

As depicted in FIG. 13, as with the second embodiment, the processes at Steps S501 to S506 are performed in the key generating process according to the third embodiment. However, at Step S506, the key is not output. Then, if it is determined at Step S501 that a key has been generated for every comparator (Yes at Step S501), the plural logical inverting unit performs a plural logical inversion (Step S507), the key is output (Step S508), and then the procedure ends.

As explained above, according to the third embodiment, when negative logical AND that negates the entire logical AND relation is set as a rule, the packet transfer controlling apparatus sets one rule with each of the classifications being a bit of 1 as a rule. Also, when an instruction for plural logical inversion for each of the comparison results output from every comparator is accepted, the packet transfer controlling apparatus performs a plural logical inversion on each of the output comparison results. Specifically, the packet transfer controlling apparatus outputs a bit string with all of the classifications each being a bit of 0 only when all of the classifications of the output comparison results are each a bit of 1, and otherwise outputs a bit string with all of the classifications each being a bit of 1. Then, the rule searching unit searches for the rules based on the bit string output by the plural logic inverting unit and outputs the rule number.

Thus, according to the third embodiment, consumption of the rule table can be reduced, which would otherwise increase with only a single logical inversion. That is, when logical inversion with N keys is simply subjected to matching, N rule table entries are consumed. Instead, with plural logical inversion, the amount of entry consumption can be 1. Also, by simultaneously applying single logical inversion and plural logical inversion, an OR condition requiring a plurality of rule table entries can be represented by a single entry.

While the embodiment of the present invention has been explained in the foregoing, the present invention may be implemented in various embodiments other than those explained above.

In the first to third embodiments, the technique is explained in which the packet transfer controlling apparatus sets an access control list on a receiving port side. However, the present invention is not restricted to this, and can be applied to a technique of setting an access control list on a transmitting port side.

Among the processes explained in the embodiments above, all or part of the processes explained as being automatically performed may be manually performed, or all or part of the processes explained as being manually performed may be automatically performed through a known method. In addition, the process procedure, the control procedure, specific names, and information including various data and parameters herein and in the drawings can be arbitrarily changed unless otherwise specified.

Furthermore, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Still further, all or arbitrary part of the process function performed in each component can be achieved by a Central Processing Unit (CPU) and a program analyzed and executed on that CPU, or can be achieved as hardware with a wired logic.

Here, the packet transfer controlling method explained in the embodiments can be achieved by executing a program prepared in advance on a computer, such as a personal computer or work station. This program can be distributed over a network, such as the Internet. Also, this program can be recorded on a computer-readable recording medium, such as a hard disk, flexible disk (FD), compact-disk read only memory (CD-ROM), magneto-optical disk (MO), and digital versatile disk (DVD), and can be read by the computer from the recording medium for execution.

According to the present invention, a reduction in circuitry size and an access control with various and complex patterns can both be achieved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A packet transfer controlling apparatus comprising:
a code storage unit that stores a plurality of associations of a code and classifications to select information from an input packet when specification of the code is accepted; and
a plurality of selecting units that sets, when specification of the code is accepted, the information that belongs to the classifications stored in the code storage unit in association with the code, and selects, when the input of the packet is accepted, the information that belongs to a classification from the information included in the input packet, wherein
a plurality of comparing units outputs a comparison result of determining whether the information selected by the selecting unit that performs a preceding process and a comparison value set as a comparison target for the selected information match each other, and further comprising
a rule searching unit that searches, when the comparison results are output from all of the comparing units, for a plurality of rules that each set a matching relation through logical AND regarding each classification, the matching relation indicating whether the information that belongs to the classification and the comparison value match each other to find which rule corresponds to the input packet, and outputs identification information that identifies the found rule; and
a transfer controlling unit that controls transfer of the packet based on the identification information output by the rule searching unit, wherein
when an affirmative matching relation indicating that the information that belongs to the classification and the comparison value match each other is a logical AND relation for the plurality of classifications and a negative logical AND that negates the logical AND relation as a whole is to be set as the rule, the packet transfer controlling apparatus sets, as the rule, one rule with each of the classifications being a bit of 1, and further comprising
a plural logical inverting unit that outputs, when an instruction for a plural logical inversion for each the comparison results output from all of the comparing units is accepted, upon output of each of the comparison results, a bit string with all of the classifications each being a bit of 0 only when all of the classifications of the output comparison results are each a bit of 1, and otherwise outputs a bit string with all of the classifications each being a bit of 1, and wherein
the rule searching unit searches for the rules based on the bit string output by the plural logic inverting unit and outputs the identification information.

2. A packet transfer controlling method comprising:
providing a code storage unit configured to store a plurality of associations of a code and classifications to select information from an input packet when specification of the code is received;
searching, in the code storage unit, for the information that belongs to the classifications stored in association with the code for a comparing step to be performed as a subsequent process when specification of the code is received;
setting the information searched for as information to be selected from the information included in the input packet; and
selecting, when the input packet is received, the information that belongs to a classification from the information included in the packet, wherein
a comparing step outputs a comparison result of indicating whether the information selected by the selecting and a comparison value set as a comparison target for selected information match each other, and further comprising
searching, when comparison results are output by the comparing step, for a plurality of rules that each set a matching relation through logical AND regarding each classification, the matching relation indicating whether the information that belongs to the classification and the comparison value match each other to find which rule corresponds to the input packet, and outputting identification information that identifies the found rule; and
controlling transfer of the packet based on the output identification information, wherein
when an affirmative matching relation indicating that the information that belongs to the classification and the comparison value match each other is a logical AND relation for the plurality of classifications and a negative logical AND that negates the logical AND relation as a whole is to be set as the rule, the packet transfer controlling method sets, as the rule, one rule with each of the classifications being a bit of 1, and further comprising
outputting, when an instruction for a plural logical inversion for each the comparison results output from all of the comparing steps is accepted, upon output of each of the comparison results, a bit string with all of the classifications each being a bit of 0 only when all of the classifications of the output comparison results are each a bit of 1, and otherwise outputs a bit string with all of the classifications each being a bit of 1, and wherein
searching for the rules based on the bit string output by the plural logic inverting and outputs the identification information.

* * * * *